United States Patent [19]
Lee

[11] Patent Number: 5,845,214
[45] Date of Patent: Dec. 1, 1998

[54] DEVICE FOR TRANSMITTING PAGING DATA AND METHOD THEREFOR

[75] Inventor: Woo-Seok Lee, Seoul, Rep. of Korea

[73] Assignee: SamSung Electronics Co., Ltd., Suwon, Rep. of Korea

[21] Appl. No.: 781,978

[22] Filed: Dec. 27, 1996

[30] Foreign Application Priority Data

Dec. 28, 1995 [KR] Rep. of Korea ................... 1995 61235

[51] Int. Cl.$^6$ ................................................... H04B 7/155
[52] U.S. Cl. ............................ 455/503; 455/507; 455/59
[58] Field of Search ................................. 455/31.1, 31.2, 455/38.1, 38.3, 502, 503, 507, 517, 59; 340/825.44

[56] References Cited

U.S. PATENT DOCUMENTS 5,287,550  2/1994  Fennell et al. ........................... 455/503
5,603,091  2/1997  Linquist et al. ......................... 455/503

*Primary Examiner*—Thanh Cong Le
*Attorney, Agent, or Firm*—Robert E. Bushnell, Esq.

[57] ABSTRACT

A paging system includes a site control module for storing paging data and activating a plurality of transmitters simultaneously in response to a transmission approval signal to transmit the stored paging data synchronously. The device includes a paging terminal for encoding paging data to transmit and generating a transmission approval signal upon completion of transmitting the paging data; a plurality of site control modules connected to the paging terminal via a private communication line, for storing the paging data in a memory prepared therein and generating the stored paging data upon receiving the transmission approval signal; and a plurality of transmitters for converting the paging data output from the site control modules into a radio paging signal to transmit; whereby the paging data is transmitted simultaneously in synchronism with the transmission approval signal.

8 Claims, 2 Drawing Sheets

DEVICE FOR TRANSMITTING PAGING DATA AND METHOD THEREFOR

CLAIM FOR PRIORITY

This application makes reference to, incorporates the same herein, and claims all benefits accruing under 35 U.S.C. §119 through my patent application for Device For Transmitting Paging Data And Method Therefor earlier filed in the Ministry of Industrial Technology on the 28th day of Dec. 1996, and there assigned Ser. No. 61235/1995.

BACKGROUND OF THE INVENTION

1. Field of the Invention

The present invention relates to a device and method for transmitting paging data in a paging system, and more particularly to a device and method for transmitting paging data using a site control module.

2. Description of the Related Art

In general, the paging data transmitted from the paging terminal to the transmitters is of FSK-modulated data (where FSK stands for Frequency Shift Keying) and is transmitted at the same speed as a processing speed of the paging data. That is, the paging data is transmitted at the same speed as an encoding speed of the paging data. Here, the processing speed of the paging data is 1200 bps in case of POCSAG code, which is very low relatively. Therefore, the conventional device and method for transmitting the paging data suffer from the disadvantage of a low efficiency for the transmission lines.

Paging data transmitted from the paging terminal is applied to the transmitters of the respective sites, simultaneously. The respective transmitters include delay circuits to have an effect of receiving the paging data, simultaneously. If the sites increase in number, the data error of the paging data received at the transmitters may also increase, thereby causing a reception trouble at a paging receiver. Moreover, although the digital signals generated from FSK modulators prepared in the respective transmitters are the same to each other, the data duty may be different from each other, thereby causing a reception trouble when a paging receiver receives the paging signal from the plurality of transmitters, simultaneously. Generally, the data duty may be affected by a distortion of the modem signals and is mainly dependent on the features of the transmission line. Since it is impossible to compensate the error of the signals received at the respective transmitters, the received data is converted into an RF signal at the transmitters to transmit, as it is, without correcting the error.

SUMMARY OF THE INVENTION

It is therefore an object of the present invention to provide a device and method for transmitting paging data in a paging system, wherein a site control module stores paging data and activates a plurality of transmitters simultaneously in response to a transmission approval signal to transmit the stored paging data.

According to an aspect of the present invention, a device for transmitting paging data includes a paging terminal for encoding paging data to transmit and generating a transmission approval signal upon completion of transmitting the paging data; a plurality of site control modules connected to the paging terminal via a private communication line, for storing the paging data in a memory prepared therein and generating the stored paging data upon receiving the transmission approval signal; and a plurality of transmitters for converting the paging data output from the site control modules into a radio paging signal to transmit; whereby the paging data is transmitted simultaneously in synchronism with the transmission approval signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DECRIPTION OF THE INVENTION

Figure 1:
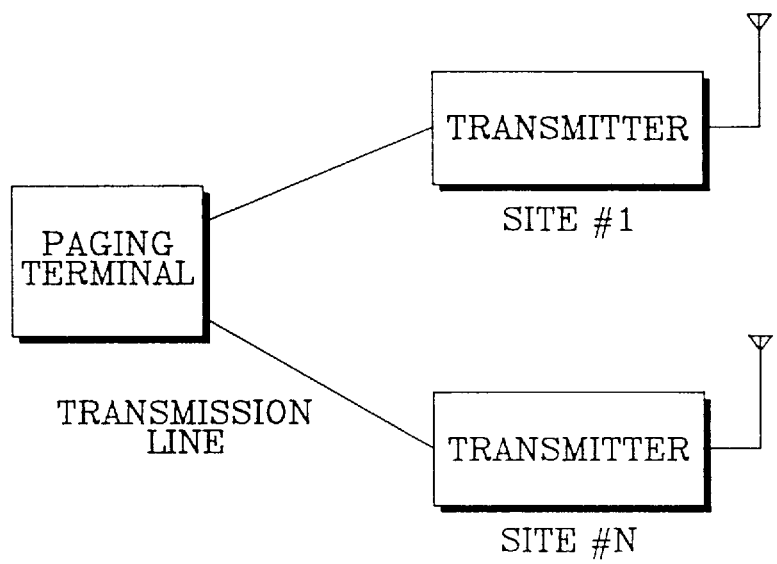
FIG. 1 shows how a paging terminal is typically connected to a transmitter.

FIG. 1 illustrates how a paging terminal is connected to transmitters installed in paging sites via private transmission lines, in accordance with contemporary practice in the art. In general, the paging data transmitted from the paging terminal to the transmitters is of FSK-modulated data (where FSK stands for Frequency Shift Keying) and is transmitted at the same speed as a processing speed of the paging data. That is, the paging data is transmitted at the same speed as an encoding speed of the paging data. Here, the processing speed of the paging data is 1200 bps in case of POCSAG code, which is very low relatively. Therefore, the conventional device and method for transmitting the paging data have a disadvantage of a low efficiency for the transmission lines.

Further, the paging data transmitted from the paging terminal is applied to the transmitters of the respective sites, simultaneously. The respective transmitters includes delay circuits to have an effect of receiving the paging data, simultaneously. However, if the sites increase in number, the data error of the paging data received at the transmitters may also increase, thereby causing a reception trouble at a paging receiver.

Moreover, although the digital signals generated from FSK modulators prepared in the respective transmitters are the same to each other, the data duty may be different from each other, thereby causing a reception trouble when a paging receiver receives the paging signal from the plurality of transmitters, simultaneously. Generally, the data duty may be affected by a distortion of the modem signals and is mainly dependent on the features of the transmission line. Further, since it is impossible to compensate the error of the signals received at the respective transmitters, the received data is converted into an RF signal at the transmitters to transmit, as it is, without correcting the error.

Figure 2:
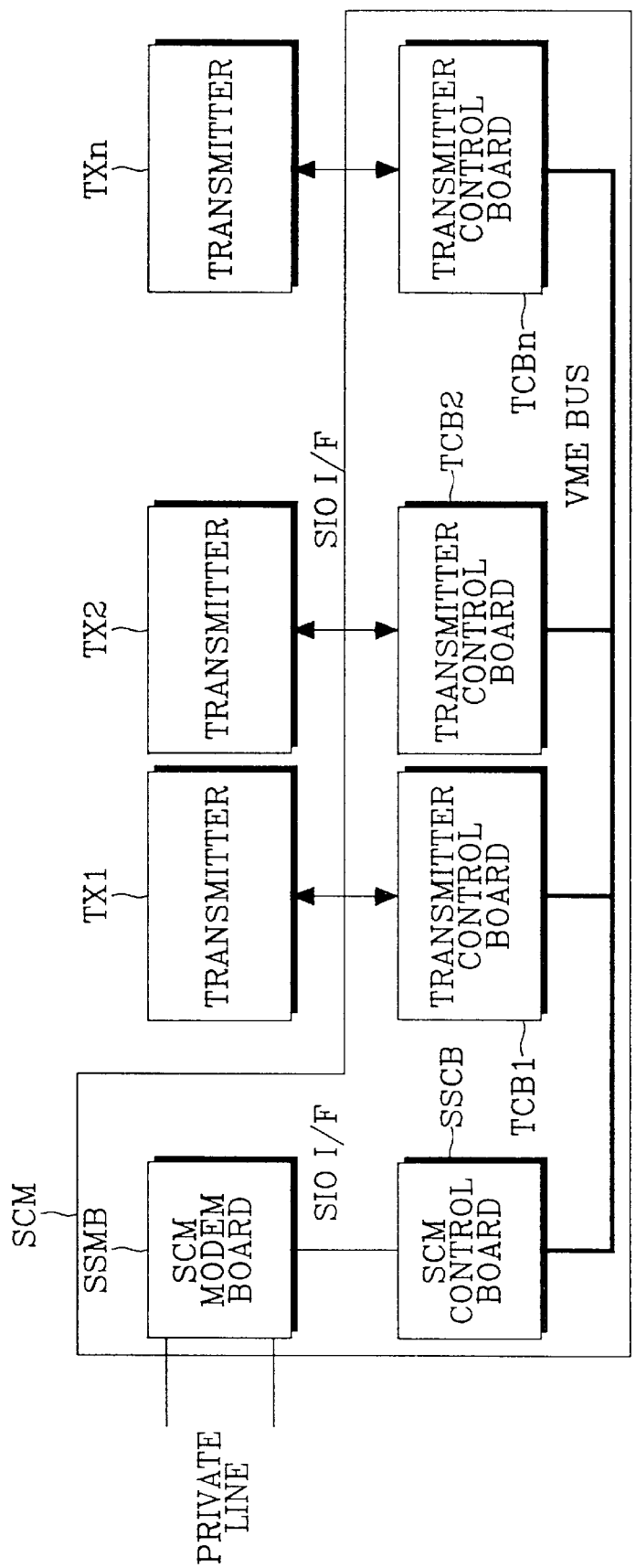
FIG. 2 shows a site control module in accordance with one embodiment of the present invention.

An embodiment of the present invention will be described hereinbelow in detail with reference to the attached drawings. Referring now to FIG. 2, a site control module (hereinafter, referred to as "SCM") of a paging system is shown according to an embodiment of the present invention, in which a SCM modem board SSMB is connected to a paging terminal through a private line. The SCM modem board SSMB decodes an analog paging signal transmitted from the paging terminal into digital paging data and thereafter, converts the digital paging data into parallel data. A SCM control board SSCB connected to the SCM modem board SSMB is connected in parallel to transmitter control boards TCB1–TCBn via a VME bus. The SCM control board SSCB generates the paging data output from the SCM modem board SSMB to the VME bus and generates a transmission approval signal for transmitting the paging data in synchronism thereto upon completion of generating the paging data. The transmitter control boards TCB1–TCBn are connected to transmitters TX1–TXn, respectively. The transmitter control boards TCB1–TCBn stores the paging data output from the SCM control board SSCB and converts the stored paging data into serial data in response to the transmission approval signal, to transmit the serial data to the transmitters TX1–TXn, respectively. The transmitters TX1–TXn convert the paging data output from the transmitter control boards TCB1–TCBn into the RF signal to transmit.

As shown in FIG. 2, the paging signal output from the paging terminal is transmitted to the respective sites via private communication lines. The paging data transmitted from the paging terminal can be processed irrespective of the transmission speed thereof, wherein the transmission speed of the paging data must be faster than that of the encoded data. According to the state of the art, the transmission speeds of the paging data are of POCSAG 512 bps, POCSAG 1200 bps, NEC 200 bps, GOLAY 300/600 bps and FLEX 6400 bps, and the transmission speed is currently on an increasing trend.

As stated above, the analog paging signal transmitted to the site is decoded into the digital paging data at the SCM modem board SSMB of the site control module SCM and then, converted into the parallel data to be transmitted. Then, the SCM control board SSCB loads the paging data on the VME bus and the transmitter control boards TCB1–TCBn receive the paging data on the VME bus to store it in a memory prepared therein. The respective transmitter control boards TCB1–TCBn can regenerate (or re-time) the paging data under the control of the SCM control board SSCB. Further, in case where the paging data transmitted from the paging terminal is of conversion data, e.g., compressed data, the conversion data may be restored to the original data.

When the paging data is completely stored in the transmitter control boards TCB1–TCBn, the transmitters TX1–TXn prepare to transmit the paging data. At the moment, the paging terminal transmits a transmission approval signal to the site control module SCM, upon completion of transmitting the paging data to the respective sites. Here, the transmission approval signal is generated in such a manner that the paging terminal transmits a key-up signal to the site control module SCM or the site control module SCM transmits the key-up signal upon receiving a synchronous signal. In detail, upon receiving the transmission approval signal, the SCM control board SSCB drives the transmitter control boards TCB1–TCBn to convert the paging data stored in the internal memory into the serial data. The serial data output is delivered to the corresponding transmitters TX1–TXn in which the serial data is again converted into the RF signal to be transmitted.

The paging data may be transmitted safely to the transmitters TX1–TXn, as the site control module SCM repeats the process of storing and transmitting the paging data as stated above. It should be noted that the site control module SCM may employ an additional function of monitoring a status of the transmitters TX1–TXn, to transmit situation information generated in the sites to the receiving or paging terminal upon checking up the status of the transmitters. As a result, the paging system with the site control module according to the present invention may accommodate various process functions.

The paging system including the site control module according to the present invention has the advantages, as follows:

Firstly, since the paging data output from the transmitter is regenerated (or re-timed), the paging data can be processed in equal to the paging data of the paging terminal so that the less data error may be generated at the paging receiver, especially in case where the plurality of sites generate the paging data, simultaneously.

Secondly, the transmission speed of an encoded signal of the paging data output from the paging terminal is variable. Namely, if the transmission speed is set as fast as possible, the paging data can be transmitted to the plurality of transmitters via a single transmission line, thereby resulting in an increase of the line efficiency and decrease of the maintenance expenses.

Thirdly, since the site control module stores the paging data, the encoded signal of the paging data output from the paging terminal can be converted. Namely, the paging terminal can compress the data to transmit, and the site control module can restore the data to the original data so that the data types for transmission may be changed in any types.

Fourthly, since the site control module stores the paging data, the plural sites may be synchronized. Namely, upon receiving the synchronous signal, the respective sites transmit the paging data stored therein to the transmitters simultaneously so that the simulcast function may be easily realized.

Fifthly, the status of the respective sites may be monitored and controlled effectively by the site control module, and the paging terminal or a central maintenance device generates the status information, thereby facilitating the maintenance.

Although various preferred embodiments of the present invention have been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A device for transmitting paging data comprising:

a paging terminal for encoding and transmitting paging data and for generating and transmitting a transmission approval signal upon completion of transmitting said paging data;

a plurality of site control modules connected to said paging terminal via respective private communication lines, each of said site control modules storing, in parallel, said paging data in a plurality of memories prepared in each of said site control modules, and each of said memories serially outputting the stored paging data simultaneously in response to said transmission approval signal; and a plurality of transmitters respectively connected to receive said serial paging data output from said memories for converting the paging data output from said memories into plural radio paging signals to be transmitted.

2. A device for transmitting paging data as claimed in claim 1, wherein said paging data transmitted by said paging terminal is an analog paging signal said site control module comprises:

a modem connected in series to the paging terminal via the private communication line, for converting said analog paging signal into digital paging data and converting said digital paging data into parallel paging data;

a site control board connected to said modem, for loading said parallel paging data on a VME bus;

a plurality of transmitter control boards each comprising a respective one of said memories connected in parallel to said VME bus, for storing the paging data in said memories and converting the stored paging data into said serial paging data in response to said transmission approval signal to transmit said serial paging data to respective ones of the plural transmitters.

3. A method for transmitting paging data, wherein a site control module is connected to a paging terminal for generating a paging signal and a transmission approval signal for simultaneously transmitting paging data to a plurality of transmitters, said plurality of transmitters simultaneously converting the paging data into radio paging signals for transmission, the method comprising the steps of:

decoding the paging signal transmitted from the paging terminal into digital paging data and storing the digital paging data in a plurality of memories prepared in the site control module;

converting the stored digital paging data into serial data upon receiving said transmission approval signal to simultaneously transmit the serial data from said memories to respective ones of the transmitters.

4. The method as set forth in claim 3, wherein said paging signal comprises compressed paging data, said converting step comprises a step of decompressing said compressed paging data for storage in said memories.

5. A device for transmitting paging data received from a paging terminal in response to a transmission approval signal generated by said paging terminal upon completion of transmitting said paging data over a private communication line, said device comprising:

a site control module connected to said paging terminal via said private communication line for storing said paging data in a plurality of memories;

each of said memories serially outputting the stored paging data simultaneously in response to said transmission approval signal; and a plurality of transmitters connected to receive said serial paging data output from respective ones of said memories for converting the serial paging data output from said memories into plural radio paging signals to be transmitted.

6. The device as set forth in claim 5, wherein said site control module comprises:

a modem for receiving analog paging data output from said paging terminal for conversion to digital paging data and for outputting said digital paging data in parallel;

a module control board for transmitting said parallel digital paging data to said memories;

each of said memories being disposed in a respective transmitter control board, wherein each of said transmitter control boards is connected to said module control board via a VME bus;

said transmission approval signal being transmitted via said modem and said module control board to each of said transmitter control boards;

each of said transmitter control boards outputting said serial paging data to respective ones of said transmitters in sync with said transmission approval signal.

7. The device as set forth in claim 6, wherein said paging terminal converts original paging data into said analog paging signal and each of said transmitter control boards regenerates said original paging data.

8. The device as set forth in claim 6, wherein said paging terminal compresses original paging data prior to transmission as said analog paging signal and each of said transmitter control boards restores said original paging data.

* * * * *